United States Patent [19]
Krohn

[11] 3,816,736
[45] June 11, 1974

[54] ARRANGEMENT FOR CONVERTING POLAR COORDINATE SERVO ACTUATING SIGNALS INTO RECTANGULAR COORDINATE ACTUATING SIGNALS

[75] Inventor: Holger Krohn, Wombach, Germany

[73] Assignee: G. L. Rexroth GmbH, Lohr/Main, Germany

[22] Filed: Nov. 3, 1972

[21] Appl. No.: 303,632

[30] Foreign Application Priority Data
Nov. 6, 1971 Germany.............................. 2155267

[52] U.S. Cl.............. 235/186, 235/189, 235/150.1, 235/151.1, 318/609
[51] Int. Cl............................................. G06g 7/22
[58] Field of Search ..... 235/186, 189, 150.1, 151.1; 318/609, 661

[56] References Cited
UNITED STATES PATENTS

| | | | |
|---|---|---|---|
| 2,926,852 | 3/1960 | Bennett............................. | 235/189 |
| 3,187,169 | 6/1965 | Trammell, Jr. et al. ............ | 235/189 |
| 3,464,016 | 8/1969 | Kerwin et al. .................... | 235/186 X |
| 3,473,011 | 10/1969 | Schmid........................... | 235/189 X |
| 3,684,880 | 3/1972 | Togawa et al. .................. | 235/189 X |

Primary Examiner—Joseph F. Ruggiero
Attorney, Agent, or Firm—Michael S. Striker

[57] ABSTRACT

An arrangement for use in servo systems, particularly copying-machine and duplicating milling machine servo systems, is operative for accepting an input signal representative of the angular deviation of a polar-coordinate controlled variable from a reference angle and converting such input signal into two rectangular-coordinate actuating signals having proportional-plus-integral characteristics. A generator generates a sine wave and a cosine wave having a frequency $f_1$. A switch when triggered permits transmission of the instantaneous values of the sinusoids. A comparator has an output, a first input and a second input and triggers the switch when equal signals are applied to the comparator inputs. A frequency transducer has an output connected to said first input and has an input, and is operative for producing a sawtooth waveform whose frequency departs from $f_1$ in dependence upon an applied signal and whose frequency is equal to $f_1$ when the applied signal is zero. The aforementioned input signal is applied to the second comparator input and also to the input of the frequency-transducer.

9 Claims, 1 Drawing Figure

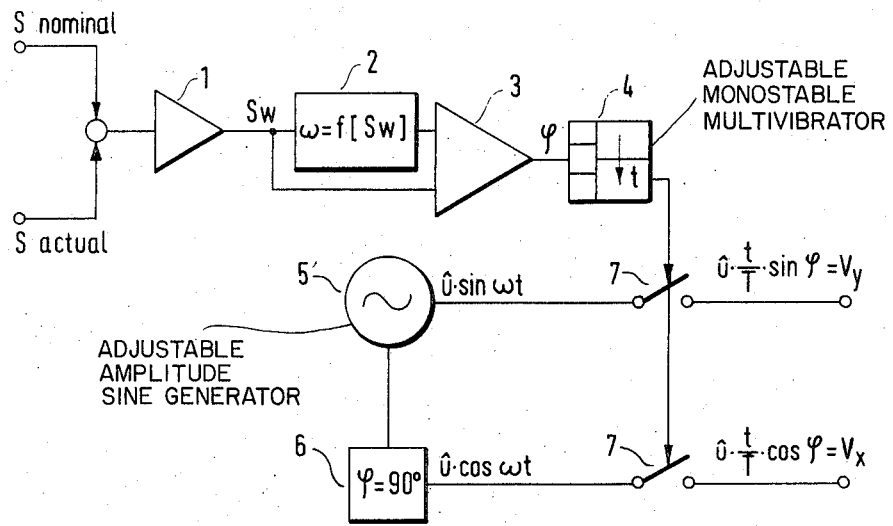

ARRANGEMENT FOR CONVERTING POLAR COORDINATE SERVO ACTUATING SIGNALS INTO RECTANGULAR COORDINATE ACTUATING SIGNALS

BACKGROUND OF THE INVENTION

The present invention relates to arrangements used in servo systems, particularly copying-machine servo systems, of the type operative for converting an input signal representative of the angular deviation of a polar-coordinate controlled variable from a reference angle and converting such input signal into two rectangular-coordinate actuating signals having proportional-plus-integral characteristics.

In a two-dimensional copying machine — and in other two-dimensional follow-up systems — it is frequently necessary to convert an actuating signal which represents a polar-coordinate angular quantity into two further actuating signals representing the corresponding rectangular-coordinate quantities. For example, if the work tool of a duplicating milling machine or lathe is to be moved in direction at an angle of 45° with respect to the horizontal, then its $x$- and $y$-components of velocity should be equal. Algebraically the conversion is expressed in the equations $$v_x = v_o \cdot \cos(2\pi S/S_{max})$$
$$v_y = v_o \cdot \sin(2 S/S_{max})$$

wherein $v_o$ is the resultant speed of movement of the work tool, S is the angular deviation of the instantaneous direction of work tool movement from a predetermined angular reference direction (e.g., the $x$-axis), and $S_{max}$ is the maximum such angular deviation encompassed within the total predetermined range of movement of the work tool.

It is already known to effect the conversion of an actuating signal indicative of a polar-coordinate angular quantity into two further actuating signals indicative of the corresponding rectangular-coordinate quantities, using function generators.

The present invention relates to arrangements for effecting such conversion of polar-coordinate actuating signals into rectangular-coordinate actuating signals. However, the present invention has the additional aspect that the rectangular-coordinate actuating signals to be furnished are to have proportional-plus-integral characteristics.

The basic concept of proportional-plus-integral control is already very well known. Reference is made for example to pages 139–142 of "Control Systems Engineering" by Del Toro and Parker, McGraw-Hill, New York, 1960. Briefly the basic difference between a purely proportional actuating signal and an actuating signal having proportional-plus-integral characteristics is the following: The purely proportional actuating signal is proportional to the deviation of the controlled variable from the commanded value. Thus, in a position-servo system, for example, the controlled variable may be the axial position of a piston, and when the servomotor brings the piston to the commanded position, the deviation or error signal becomes zero, the proportional actuating signal becomes zero, the servomotor ceases to move the piston further, and the piston remains in the commanded position without the servomotor requiring any energy to maintain the steady-state piston position.

By way of contrast, if the controlled variable is velocity, rather than mere position, then, when the commanded servomotor speed is reached, the actuating signal, which is proportional to the velocity error, falls to zero. When that happens, the steady-state cannot be maintained, because the servomotor requires energy simply to maintain the steady-state speed. Accordingly, a discrepancy again arises between the commanded and actual servomotor speeds, so that an actuating signal again is created and so that the servomotor is again supplied with energy. Thus, when the controlled variable is velocity, instead of position, there will in the steady state be a definite discrepancy between the commanded and actual servomotor speeds, so as to keep an actuating signal in existence.

To avoid this steady-state discrepancy between commanded and actual servomotor speeds, resort is often had to proportional-plus-integral compensation. With this compensation the actuating signal consists of two distinct components: one proportional to the discrepancy between the actual and commanded servomotor speeds, and the other proportional to the time integral of such discrepancy. Accordingly, when the commanded speed is finally reached, the purely proportional component of the actuating signal falls to zero, but the integral component stays at a non-zero value large enough to maintain the servomotor at the commanded speed in the absence of the purely proportional actuating signal component.

Implementing this kind of compensation can present certain difficulties. Function generators cannot in general perform an unlimited integration, and accordingly, it is usually necessary to de-energize the integrating element of the amplifier of such integral function generators by switch means when the integration has proceeded to a certain extent. Alternatively, the function generator can be used solely for the proportional component of the actuating signal, with the integral component of the actuating signal being superimposed thereupon and furnished by an electromechanical function generator having an unbounded integrating capability.

SUMMARY OF THE INVENTION

It is thus the main object of the invention to provide an arrangement which converts polar-coordinate actuating signals into rectangular-coordinate actuating signals having proportional-plus-integral characteristics.

It is a related object to provide an arrangement which converts a proportional error signal into an actuating signal having proportional-plus-integral characteristics.

It is a particular object to provide such an arrangement which is simple, and inexpensive.

These and other objects of the invention can be met by an arrangement for use in follow-up systems and the like, operative for accepting an input signal representative of the angular deviation of a polar-coordinate controlled variable from a reference angle and converting such input signal into two rectangular-coordinate actuating signals having proportional-plus-integral characteristics. The arrangement includes generator means for generating first and second periodic waveforms of identical predetermined frequency $f_1$ phase-shifted relative to each other by 90°, and switch means connected to the output of said generator means and operative when triggered for momentarily permitting transmission of the instantaneous values of said periodic waveforms. The arrangement further includes comparator means having an output, a first input and a second input and operative for triggering said switch means when equal signals are applied to said inputs. Frequency-transducer means having an output connected to said first input and having an input, is operative for producing an additional periodic waveform whose frequency departs from $f_1/n$ n being an integer including unity, in dependence upon an applied signal and whose frequency is equal to $f_1/n$ when the applied signal is zero. The aforementioned input signal is applied to said second input of said comparator means and also to the input of said frequency-transducer means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a schematic circuit diagram of one embodiment according to the invention.

DESCRIPTION OF THE PREFERRED EMBODIMENTS

Reference numeral 1 designates a proportional amplifier which accepts an error signal corresponding to the difference between the commanded, or nominal angular value of the controlled variable S minus the actual angular value of the controlled variable S. At the output of amplifier 1 there appears an amplified error signal, designated $Sw$. Error signal $Sw$ is applied to one input of a frequency-transducer 2. In this embodiment, frequency-transducer 2 is operative for generating a sawtooth waveform whose frequency departs from a predetermined frequency $f_1$ in accordance with the equation $f_2 = f_1 + kSw$, where $k$ is a proportionality factor. As will be explained later, the base or carrier frequency $f_1$ of frequency-transducer 2 is identical to the frequency of sine-wave generator 5. Whereas in this embodiment, frequency-transducer 2 generates a sawtooth waveform, other waveforms can be used; for instance, a periodic waveform having a linear portion proportional to time may suffice, and even a sinusoidal waveform has approximately these characteristics at its cross-over region, if its amplitude is sufficiently high.

Reference numeral 3 designates a comparator having a first input connected to the output of frequency-transducer 2 and having a second input connected to the output of proportional amplifier 1. Comparator 3 is operative for comparing the instantaneous error signal $Sw$ against the instantaneous amplitude of the variable-frequency sawtooth waveform generated by frequency-transducer 2. When these two quantities are equal, comparator 3 produces at its output a triggering signal which, in a manner to be described, specifies a certain phase relationship $\phi$, also to be described.

Reference numeral 4 designates a monostable multivibrator. Reference numeral 5 designates a sine-wave generator generating a sine wave of amplitude $u$ and frequency $f_1$, i.e., the same frequency as the base or carrier frequency of frequency-transducer 2, in this embodiment. Reference numeral 6 designates a cosine-wave generator, which furnishes a waveform identical to that generated by generator 5, but shifted from the latter by 90°.

The outputs of sine generator 5 and cosine generator 6 can be connected via switches 7, to the $x$- and $y$-velocity inputs of a non-illustrated servomechanism, follow-up mechanism or other such mechanism operative for controlling the two-dimensional movement of a controlled member on the basis of rectangular coordinates. Switches 7 are closed during the astable period of monostable multivibrator 4, this astable period having a time duration $t$.

The operation of the arrangement is as follows:

Assume that the error signal $Sw$ is zero, which it will be in the steady state, indicating that the angular value of the controlled variable has reached the commanded value. Accordingly, the frequency of the sawtooth waveform furnished by transducer 2 will be identical to the frequency of the sinusoids furnished by generators 5 and 6, for instance 1,000 Hz. In general, the sawtooth waveform and the sine wave furnished by generator 5, in the steady state, will not be in phase. However, for the sake of simplicity, assume that they are in phase at the particular instant at which one begins to observe the circuit operation.

In the steady state $Sw = 0$, and accordingly comparator 3 will produce a triggering output signal at each point at which the sawtooth waveform of transducer 2 has zero amplitude; assuming a base frequency of 1,000 Hz, this will occur 1,000 times per second. Accordingly, monostable multivibrator will be triggered 1,000 times per second, and will serve to close switches 7, 1,000 times per second, closing the switches 7 each time for a time period $t$ equal to the duration of the astable multivibrator period. Since it has been assumed, for simplicity, that the sawtooth waveform and the sine wave from generator 5 are in phase, it is clear that the sinusoid produced by generator 5 will have an amplitude of zero each time switch 7 is closed, under the conditions just described. Accordingly, the sinusoid produced by generator 6 will have maximum amplitude each time switch 7 is closed, under the described conditions. Therefore, only the $x$-velocity signal will have a non-zero value, and the controlled member will move only in the $x$-direction, i.e., in a polar-coordinate angular direction making an angle of 0° with the reference $x$-axis. From this it will be realized that when the sawtooth waveform and the sinusoid from generator 5 are of identical frequency and in-phase, the controlled member is moving at a commanded polar-coordinate angle of 0°, with reference to the $x$-axis.

Assume now that there is a change in the commanded value of the angular direction of movement of the controlled member; assume for instance that whereas the control member had been travelling, previously, at an angle of 0°, it is now to commence movement at a polar-coordinate angle of 10° with respect to the $x$-axis. Until this new angular direction has been achieved, there will exist a discrepancy between the actual and commanded angular directions, and accordingly the error signal $Sw$ will no longer be zero. As will be explained now, this change from zero of $Sw$ results in a phase-shift, relative to the sinusoid from generator 5, of the moments at which switches 7 close. Whereas in the previously described circumstances switch 7 would close only at those moments when the sine wave has zero amplitude (zero phase shift), switch 7 will now close during non-zero values of the sine wave. We can say, therefore, that a phase-shift has been effected in the closing of switch 7 relative to the sine wave.

This phase shift has two distinct components, respectively corresponding to the proportional and to the integral components of the proportional-plus-integral actuating signal.

The first component of phase shift is associated directly with the change in the value of $Sw$, and corresponds to the purely proportional component of the actuating signal. Specifically, this first phase-shift component is proportional to the error signal $Sw$, and remains constant so long as $Sw$ remains constant. If $Sw$ changes, the first phase-shift component changes in proportion. This first phase-shift component results from the change of the amplitude at which comparator 3 produces an output signal. Mathematically, the first phase-shift component can be expressed as follows:

first phase-shift component = $Sw/u_a'$ where $Sw$ is the amplitude of the error signal, and where $u_a'$ is the slope of the sawtooth waveform. As already mentioned, this first phase-shift component will remain constant so long as the error signal $Sw$ remains constant. In actual practice, of course, $Sw$ will shrink to zero as the steady state is reached, and accordingly the first component of phase-shift will also shrink to zero.

The first component of phase-shift does not take into account the frequency change of the sawtooth waveform generated by frequency-transducer 2. Indeed, if frequency-transducer 2 were replaced by a sawtooth generator of constant frequency $f_1$ (equal to the frequency of the sine and cosine waves), then the arrangement would be a purely proportional arrangement, and not an arrangement of the proportional-plus-integral type. If the frequency of the sawtooth waveform were kept constant at $f_1$, then the phase-shift would always be proportional to the value of the error signal, and the arragement would be operative solely for converting a polar-cordinate angular actuating signal into two rectangular coordinate actuating signals, without the addition of integral compensation.

The additional of integral compensation results from the variations in frequency of the sawtooth waveform. In addition to the proportional first phase-shift component just discussed, the frequency change produces a second phase-shift component which is cummulative, corresponding to the integral component of the proportional-plus-integral actuating signal. As already indicated, the frequency of the sawtooth waveform is $f_2 = f_1 + kSw$ where $Sw$ is the error signal and $k$ is a proportionality factor. To appreciate the cummulative, or integrating nature of the second phase-shift component, assume for example, that the magnitude and sign of $Sw$ are such as to cause the sawtooth frequency to become 1,010 Hz, in contrast to the 1,000 Hz sine wave from generator 5. Furthermore, assume for simplicity that $Sw$ remains constant for several cycles of the waveforms. The phase angle $\phi$, relative to the sine wave of generator 5, at which switches 7 will be closed, changes by the sum of the two phase-shift components just described. The first phase-shift component is proportional to $Sw$ and remains constant as long as $Sw$ remains constant. The second phase-shift component results from the cummulative phase-shift resulting from the 10 Hz frequency difference, and increases with each passing cycle.

In actual operation, now, $Sw$ will not remain constant, but will shrink to zero. The cummulative, second phase-shift component, however, will not vanish in the steady state, even though $f_2$ again equals $f_1$. This cummulative, or integrated second phase-shift component serves to create suitable actuating signals to maintain desired motion of the controlled member even after the error signal has dropped to zero, which of course is the principal purpose of proportional-plus-integral control.

The effect of these two phase-shift components on the values of the $x$- and $y$-velocity signals transmitted upon the closing of switches 7 can be expressed mathematically. The instantaneous amplitudes of the sine and cosine waves, at the times switches 7 are closed, can be expressed as $u \cdot \sin[Sw + 1/T \int Sw \cdot dt] [f(\phi)]$ and $u \cdot \cos[Sw + 1/T \int Sw \cdot dt] [f(\phi)]$ These pulses, becaus of their relatively high frequency, can advantageously be applied directly to the $x$- and $y$-inputs of the control arrangement, to energize the $x$- and $y$-servomotors. The amount of energy furnished to each servomotor will depend not only on the above-defined instantaneous transmitted amplitudes of the sinusoids, but will also depend on the length of time for which the switches 7 are closed — i.e., on the astable period $t$ of the multivibrator, as well as on the number of times the switches 7 are closed per second — i.e., on the frequency $f = 1/T$. Accordingly, the actual $x$- and $y$-components of velocity can be given by $v_y = u \cdot t/T \cdot \sin[SW + 1/T \int Sw \cdot dt] [f(\phi)]$ and $v_x = u \cdot t/T \cdot \cos[Sw + 1/T \int Sw \cdot dt] [f(\phi)]$ The resultant speed can be expressed as $v_R = u \cdot t/T \cdot [\sin^2 100 + \cos^2 \phi]^{1/2}$ This resultant speed can be controlled by controlling the amplitude $u$ of the sine and cosine waves, and/or by controlling the time $t$ for which the switches 7 stay closed.

It will be understood that each of the elements described above, or two or more together, may also find a useful application in other types of circuits and constructions differing from the types described above.

While the invention has been illustrated and described as embodied in an arrangement for converting a polar-coordinate actuating signal into two rectangular-coordinate actuating signals having characteristics resembling those of the actuating signals in proportional-plus-integral control arrangements, it is not intended to be limited to the details shown, since various modifications and structural changes may be made without departing in any way from the spirit of the present invention.

Many mathematical variations are possible without changing the basic concept of the present invention. For example, in the disclosed embodiment of base or carrier frequency $f_2$ of the sawtooth waveform is identical to the frequency $f_1$ of the sine and cosine waves when $Sw$ is zero. However, the basic action would still be the same if for instance $f_2 = (f_1/n) + kSw$, where $n$ is any integer including, in the illustrated embodiment, unity. Other such mathematical manipulations are possible.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention, and, therefore, such adaptations should and are intended to be comprehended without the meaning and range of equivalence of the following claims.

What is claimed as new and desired to be protected by Letters Patent is:

1. An arrangement for use in follow-up systems and the like, operative for accepting an input error signal having a magnitude indicative of the angular deviation of a polar-coordinate controlled variable from a reference angle and converting such input error signal into two rectangular-coordinate actuating signals having proportional-plus-integral characteristics, comprising, in combination, generator means for generating first and second periodic waveforms of identical predetermined frequency $f_1$ phase-shifted relative to each other by 90°; switch means connected to the output of said generator means and operative when triggered for momentarily permitting transmission of the instantaneous values of said periodic waveforms; comparator means having an output, a first input and a second input and operative for triggering said switch means when equal signals are applied to said first and second inputs of said comparator means; frequency-transducer means having an output connected to said first input of said comparator means and having an input, and operative for producing an additional periodic waveform whose frequency departs from $f_1/n$, $n$ being an integer, in dependence upon the magnitude of the signal applied to the input of said frequency-transducer means and whose frequency is equal to $f_1/n$ when the magnitude of the signal applied to said input of said frequency-transducer means is zero; and means for applying an error signal to said second input of said comparator means and also to said input of said frequency-transducer means.

2. An arrangement for use in follow-up systems and the like, and operative for accepting an input error signal having a magnitude indicative of the deviation of a controlled variable from a reference value and converting such input error signal into an actuating signal having proportional-plus-integral characteristics, comprising, in combination, generator means for generating a first periodic waveform of predetermined frequency $f_1$; switch means connected to the output of said generator means and operative when triggered for momentarily permitting transmission of the instantaneous value of said first waveform; comparator means having an output and having a first input and having a second input and operative for triggering said switch means when equal signals are applied to said first and second inputs of said comparator means; frequency-transducer means having an input and having an output connected to said first input of said comparator means and operative for producing an additional periodic waveform whose frequency departs from $f_1/n$, $n$ being an integer, in dependence upon the magnitude of the signal applied to said input of said frequency-transducer means and whose frequency is equal to $f_1/n$ when the magnitude of the signal applied to said input of said frequency-transducer means is zero; and means for applying an error signal to said second input of said comparator means and also to said input of said frequency-transducer means.

3. An arrangement as defined in claim 1, wherein said first and second periodic waveforms are at least approximately sinusoidal.

4. An arrangement as defined in claim 1, wherein said additional periodic waveform for at least part of one period thereof has a magnitude proportional to time.

5. An arrangement as defined in claim 1, wherein said first and second periodic waveforms are at least approximately sinusoidal, and wherein said additional periodic waveform for at least part of one period thereof has a magnitude proportional to time.

6. An arrangement as defined in claim 1, wherein said comparator means is operative for triggering said switch means only when the instantaneous slope of said additional periodic waveform has a preselected polarity.

7. An arrangement as defined in claim 6, wherein said comparator means comprises a monostable multivibrator.

8. An arrangement as defined in claim 7, and further including means for controlling the astable period of said multivibrator.

9. An arrangement as defined in claim 1, and further including means for varying the amplitude of said first and second periodic waveforms.

* * * * *